Aug. 22, 1950        A. A. TUNLEY        2,520,073
ROD ARRANGEMENT FOR CONVEYER PLAQUES
Filed May 11, 1946        2 Sheets-Sheet 1
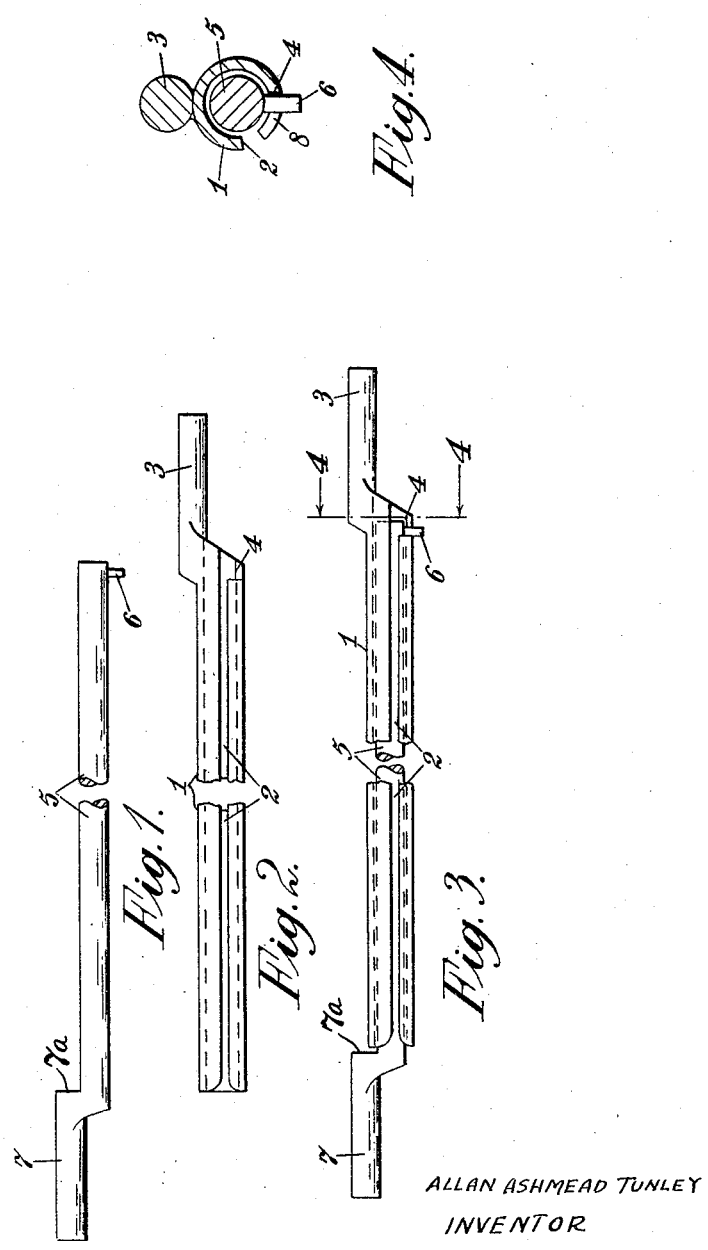
ALLAN ASHMEAD TUNLEY
INVENTOR
BY
George B. Willcox
ATTORNEY.

Aug. 22, 1950     A. A. TUNLEY     2,520,073
ROD ARRANGEMENT FOR CONVEYER PLAQUES

Filed May 11, 1946     2 Sheets-Sheet 2

INVENTOR.
ALLAN ASHMEAD TUNLEY,
BY George B. Willcox
ATTORNEY.

Patented Aug. 22, 1950

2,520,073

UNITED STATES PATENT OFFICE 2,520,073

ROD ARRANGEMENT FOR CONVEYER PLAQUES

Allan Ashmead Tunley, Peterborough, England, assignor to Baker Perkins Limited, Peterborough, England Application May 11, 1946, Serial No. 669,092
In Great Britain May 28, 1945

3 Claims. (Cl. 198—1)

This invention relates to driving rods or like devices for aprons or plaques for transporting chocolates, confectionery or other goods and is especially applicable to plaques of the kind used in circuitous chocolate or like enrober cooling plant of the type in which the plaques are transported on trays between a pair of endless chains in a circuit wherein they travel between a feeding station and a delivering station and wherein at one point the plaques are removed from the trays and at the other point returned thereto.

It is customary to employ plaques each of which has a head fold or hem through which is passed a rod which with the plaque fold is slid loosely into a tubular plaque driving device having a longitudinal slot from which the plaque sheet issues. These tubular driving devices terminate in both directions in a trunnion-like extension (which may be referred to hereinafter as a trunnion). These trunnions, which project laterally beyond the plaque margins, are adapted to engage chain lugs when the plaques are taken from the trays by the chains, while when the plaques are located on the travelling trays the trunnions reside in slotted plates provided for them on the trays.

It has been found that these loose rods tend to slide or creep longitudinally during working operations owing to vibration or other circumstances and there is a danger of one or other of the rod ends becoming displaced longitudinally to such an extent that it may foul some fixed or moving part of the plant.

An aim of the present invention is to avoid such defect and provide a plaque head rod and tubular assembly, termed two-part plaque driving device in which the plaque rod is definitely located longitudinally in such manner that there is no relative creep or accidental sliding of the rod under ordinary conditions of use.

A further object of the invention is to provide positive engaging means, such as the pin and slot connection shown herein, for retaining the plaque rods in their tubes even when the driving devices are removed from the plant, while enabling the plaques readily to be released from the device when it is necessary to separate the plaque therefrom, for renewal or other purposes.

The invention consists of a two part plaque driving device, comprising a longitudinally slotted tubular member having a trunnion at one end only, and a plaque rod having a trunnion at its end remote from the trunnion on the tubular member, the axes of said trunnions being offset alike from the common axis of the tubular member and rod.

At the trunnionless end of the plaque rod a projecting pin may be provided which is adapted to engage with (or be released from) a recess in the adjacent end of the tubular member, by partial rotational manipulation in order that the parts may be interlocked longitudinally and may be released as desired.

In the accompanying drawings:

Figure 1 is an elevation of the rod element,

Figure 2 is an elevation of the slotted tubular element,

Figure 3 is an elevation of the rod and tubular element assembled as a two part driving device for a plaque.

Figure 4 is a cross section on line 4—4 of Figure 3.

Figure 5:
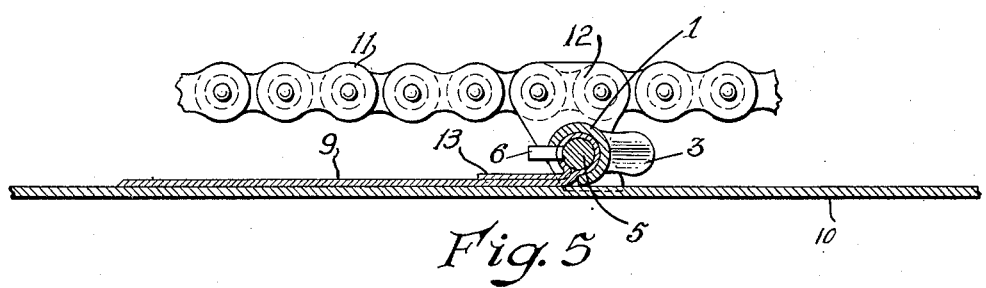
Figure 5 is a longitudinal sectional view on line 5—5 of Fig. 7, showing my plaque rod device assembled with a plaque supporting table, and a traveling dog chain with lugs for engaging the trunnions of the rod and thus transporting the plaque under typical conditions of use.

In carrying the invention into effect according to one mode, as described by way of example, a hollow elongated plaque holder or tube 1 slotted throughout its length is provided, the slot 2 being of suitable width to accommodate the hem end or head of a plaque as referred to below. One end of the tube 1 may be slightly bevelled, as shown in Fig. 2 and above the bevelled portion a trunnion 3 is welded or otherwise secured to the outer surface of the tube. The trunnion 3 may be a short rod and is positioned with its axis parallel to the axis of the tube and offset therefrom, as shown in Fig. 4, so as to leave the slot 2 unobstructed. One lip of the tube slot 2 at the end adjacent the said trunnion 3 has an open solt or rebated recess 4, providing a transverse shoulder 8, Fig. 4. Instead of making the end of the tube bevelled, as above instanced, it may be of other shape to accord with the part such as the lug shown in Figs. 5 and 6 with which the trunnion may engage on the tray or chain.

The other end of the tube 1 terminates in a plane at right angles to its axis.

The tubular member and trunnion described above constitute one part of the two part plaque driving device. The other part consists of a thin rod 5 which is adapted to be threaded through the hem at the head of a plaque sheet and the rod with its plaque hem attached is thrust into the tubular member 1 with the plaque protruding through the longitudinal slot 2 of the tube. One end of the rod 5 is provided with a pin or projection 6 projecting at right angles to the axis of the rod 5; and this pin is for the purpose of engaging in the open slot or rebate 4 referred to above. The other end of the rod 5, Fig. 1, is bevelled, in a similar manner to the opposite end of the tubular member 1; and above the bevelled portion a trunnion 7, similar to the trunnion 3, extends parallel with the axis of the rod 5 but offset therefrom, to the same or similar extent that the trunnion 3 on the tubular member 1 is offset. The rod 5 with its plaque is thrust home into the slotted member 1 so that an inner shouldered end 7a of its trunnion 7 abuts against the adjacent end of the tubular member 1. When the rod 5 is given a fractional rotational turn to bring pin 6 into engagement with shoulder 8 of the recess or rebate 4, the two trunnions 3 and 7 lie axially in alignment and the parts are longitudinally locked together, as shown in Fig. 4.

Figure 6:
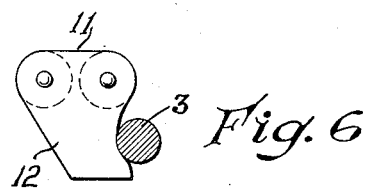
Fig. 6 is a side view of a lug on the chain to engage the trunnion for transporting the plaque along the table as shown in Fig. 5.
Figure 7:
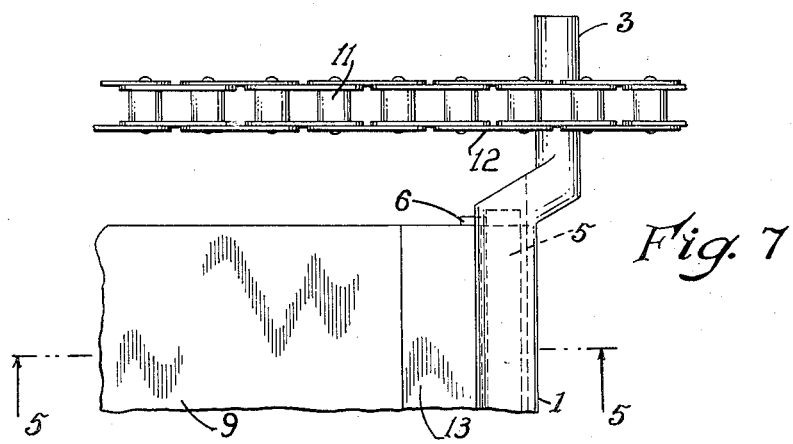
Fig. 7 is a fragmentary top plan view of the chain, the plaque, the rod, and one of the trunnions, the table that is shown in Fig. 5 being omitted.

By the above arrangement it will be appreciated, when the improved driving device is in position either upon a tray or carried by the chains Figs. 5, 6, 7, the trunnioned ends 3 and 7 of the tube 1 and rod 5 may be located against positioning lugs so that no lengthening movement of the assembled rod and tubular member can take place.

The engagement of the rod pin 6 and tube rebate 4 also prevents lengthening of the assembly, and a shoulder on trunnion 7 prevents its shortening. It will be appreciated that when a plaque and its rod, tube, and trunnions, or driving device are removed from the table, the rod is kept from being accidentally slid out of its tubular member by the engagement between the pin 6 on the rod and the wall of the rebate or recess 4 on the tube. To show the particular use and manner of application of the foregoing features of the prior art, the particular association of the flexible plaque to the driving device is shown in Figs. 5, 6, 7, which also show the prior art environment structure for the driving device. In these Figs. 5, 6, 7, numeral 9 designates the plaque; 10 the supporting table; 11 the traveling dog chain; 12 the lug; and 13 the hem of the plaque.

I claim:

1. A two part plaque driving device comprising a longitudinally slotted tubular member having a trunnion at one end only, and a plaque rod having a trunnion at its end remote from the trunnion of the tubular member, the axes of the trunnions being offset from the axes of the tubular member and rod, and fastening means for operatively connecting said rod and tubular member against relative movement.

2. A driving device as claimed in claim 1, wherein the trunnionless end of the rod is provided with a radial projection adapted to engage a transverse shoulder presented as a wall of a recess in the adjacent end of the tubular member by a relative rotary movement of the plaque rod and tubular member to releasably lock them against relatively longitudinal movement.

3. A plaque driving device of the character described comprising a longitudinally slotted tubular member having a trunnion at one end only and a plaque rod adapted to be inserted into said tubular member while wrapped about with a plaque head portion, said plaque rod having at its end a trunnion remote from the trunnion of the tubular member, the axes of both trunnions being offset alike from the axis of the tubular member and rod, and additional means such as a pin and slot joint at one end of the rod and a shoulder at the other end, for releasably locking the tubular member to the rod, for preventing relative longitudinal movement of the rod and tubular member.

ALLAN ASHMEAD TUNLEY.

REFERENCES CITED

The following references are of record in the file of this patent:

UNITED STATES PATENTS

| Number | Name | Date |
| --- | --- | --- |
| 1,672,522 | Greer et al. | June 5, 1928 |